Jan. 26, 1971 J. J. COLLINS 3,559,172
INFORMATION PRESENTATION CIRCUIT
Filed Oct. 2, 1967 3 Sheets-Sheet 1

SEQUENCE & ADVANCE CONTROL CCT.

INVENTOR
J. J. COLLINS
BY
Brendan A. Ward
ATTORNEY

SEQUENCE COUNTING CCT.

United States Patent Office 3,559,172
Patented Jan. 26, 1971

3,559,172

INFORMATION PRESENTATION CIRCUIT

John J. Collins, Columbus, Ohio, assignor to Bell Telephone Laboratories, Incorporated, Murray Hill and Berkeley Heights, N.J., a corporation of New York Filed Oct. 2, 1967, Ser. No. 672,035
Int. Cl. H04q 3/47
U.S. Cl. 340—147 13 Claims

ABSTRACT OF THE DISCLOSURE

A circuit for providing timing information is arranged with a pair of relay translation networks, each of which is sequentially enabled to provide a current time indication corresponding to a counted number of signals. Delay in updating the current timing information is negated by operating the relays of one translation network in response to receipt of each signal in preparation for the presentation of the next time indication while concurrently providing the current time indication through the previously operated relay contacts of the other translation network.

BACKGROUND OF THE INVENTION (1) Field of the invention

This invention pertains to information presentation circuits and more specifically to a circuit for providing successive time indication signals to a recorder.

(2) Description of the prior art

The development of solid state electronic devices, typified by the transistor, has served to open a new era in electrical circuit design. No longer is the circuit designer bound by the inherently slow operation of electromechanical circuit elements such as the relay. The solid state components typically operate within a millionth of a second, as compared to the typical relay which has an operate time in the order of a tenth of a second. Therefore, a new dimension, speed, has become of increasing significance in the design of electrical circuitry.

A modern data recorder circuit is one example of the advantageous utilization of the almost instantaneous operation of the transistor. Such circuits are capable of handling large volumes of information every second. However, in order for the economies of such high speed recorder systems to be realized, it is necessary that all such data be presented to the system without the introduction of delays associated with this communication.

In many such system applications it is desired to record highly accurate time data. However, increasing the accuracy of time data is accomplished only by decreasing the interval between the presentation of each successive time value. It follows therefore that accurate time information will, by definition, be rapidly changing in value. Accordingly, the introduction of even the smallest delay could be on the order of several time periods thus negating the accuracy of the information presented.

One example of a data recording system dependent upon accurate external time data is the automatic message accounting system used in the telephone industry for billing purposes. A typical system of this type is disclosed in U.S. Pat. No. 2,688,658, dated Sept. 7, 1954, issued to W. W. Carpenter. As set forth in the Carpenter patent, in order to determine the proper charge for a toll call, it is necessary to record the length of the call in terms of minutes. For this purpose, an entry is made on a recording medium indicating the time of the initiation of the call. A corresponding entry is recorded at the conclusion of the call. From these two entries the length of the call can be computed.

In the aforementioned Carpenter patent, time data, in terms of minutes and tenths of a minute, is presented to the recorder when necessary. This six-second interval between time value corrections, however, presents numerous problems in modern message accounting systems. As one example, the total billable time for high speed data transmission between telephone connected computers could easily be measured in terms of seconds. A loss of six seconds could, therefore, constitute a relatively large percentage of the total transmission time.

To obviate the foregoing problem, it is necessary that time information corrections be accomplished without the introduction of delays during the update intervals. This problem is compounded in that the possibility exists that the time data as written for a given entry may be changed for the next entry and that this next entry follow immediately after the first.

The continuously changing nature of the time data information presents additional problems. For example, it is possible that, while time data corresponding to a certain time period is being recorded, it becomes necessary to update that time data to the next time period. Errors, such as double timing entries, could easily occur under these circumstances. Therefore it is necessary that the updating of such information be inhibited during any interval when the information is in the process of being transmitted.

A further factor which must be given consideration in an information presentation circuit is the environmental conditions under which the system must work. A solid state time presentation circuit, which could be feasible from a circuit speed standpoint, may become excessively expensive when required to overcome electronically noisy conditions, as when placed in an environment of relay circuits.

The obvious expedient, of course, would be the use of a relay time presentation circuit. Conventional relay circuits, however, have the inherent disadvantage of relatively slow operational characteristics as earlier noted. Thus, relays present the problem that a greater interval is required between successive time value presentations than that which is desired for maximum efficiency of the recording system.

Accordingly, a need exists in the art for an arrangement whereby a data presentation circuit is capable of transmitting discrete values of rapidly changing information, with minimal delays during the information correction intervals, with inhibiting of the correction circuitry whenever the information is in the process of being transmitted, and which arrangement will economically accomplish the foregoing under a variety of adverse environmental conditions.

SUMMARY OF THE INVENTION

In one exemplary embodiment of my invention, a series of discrete value indications constituting time data accurate to the second is provided to a recorder circuit without introducing delays as the time values are being changed. Each of a pair of output translation networks is sequentially enabled to provide a value corresponding to a counted number of signals generated at specified intervals, which in this embodiment are one second intervals. Apparatus is operative in response to receipt of each signal for enabling one of the translation networks to provide an output time value while concurrently increasing the value of the other translation network.

More specifically in accordance with this illustrative embodiment of my invention, a timer motor provides a pulse once each second to a relay counting circuit in which the relays operate and release in order. The counting circuit controls the two translation networks which generate the seconds data. For any even number of counted pulses, a first or even translation network is effective to provide an output code associated with that output time or number. For any odd number, the other or odd network provides the required output code. Therefore, upon receipt of a pulse, one translation network changes to reflect the code associated with the new counted number of the pulses while the other translation network remains fixed. When a seconds update is necessary, a fast acting relay operates to connect the output circuit to the fixed translation network. In addition the operation of this relay initiates the change in the translated code in the non-connected network; the inherent delay involved in changing the translated code to represent the new time count thus has no adverse effects on the subsequent apparatus or circuitry.

In accordance with one feature of my invention, in an information presentation circuit a pair of translation networks are arranged alternately to provide output values in arithmetical progression.

In accordance with another feature of my invention, the output value associated with each output network in an information presentation circuit is changed concurrently with the presentation of the value associated with the other network to the utilization circuit or apparatus.

In accordance with still another feature of my invention, these dual channel translation networks provide time indication output data corresponding to a counted number of signals, which data is continuously available on a common bus for recording purposes.

In accordance with still another feature of my invention, the output data presented by an information presentation circuit is inhibited from being updated whenever the data is in the process of being transmitted.

DESCRIPTION OF THE DRAWING

The foregoing and other objects, features and advantages of my invention will be more apparent from consideration of the following detailed description and the drawing, in which.

Figure 2:
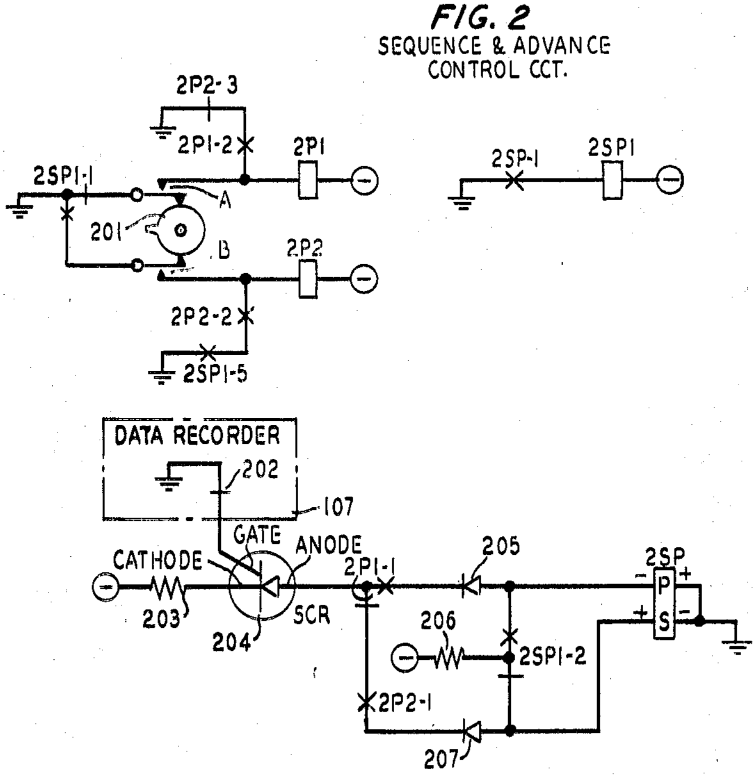
FIGS. 2, 3, and 5 are schematic representations of illustrative circuits employed in the exemplary embodiment of FIG. 1.
Figure 3:
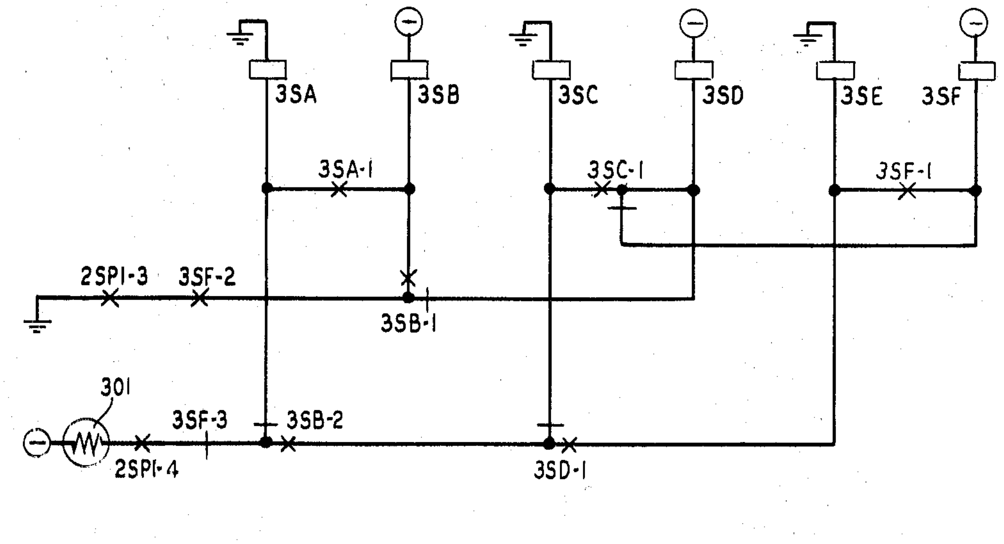
Figure 5:
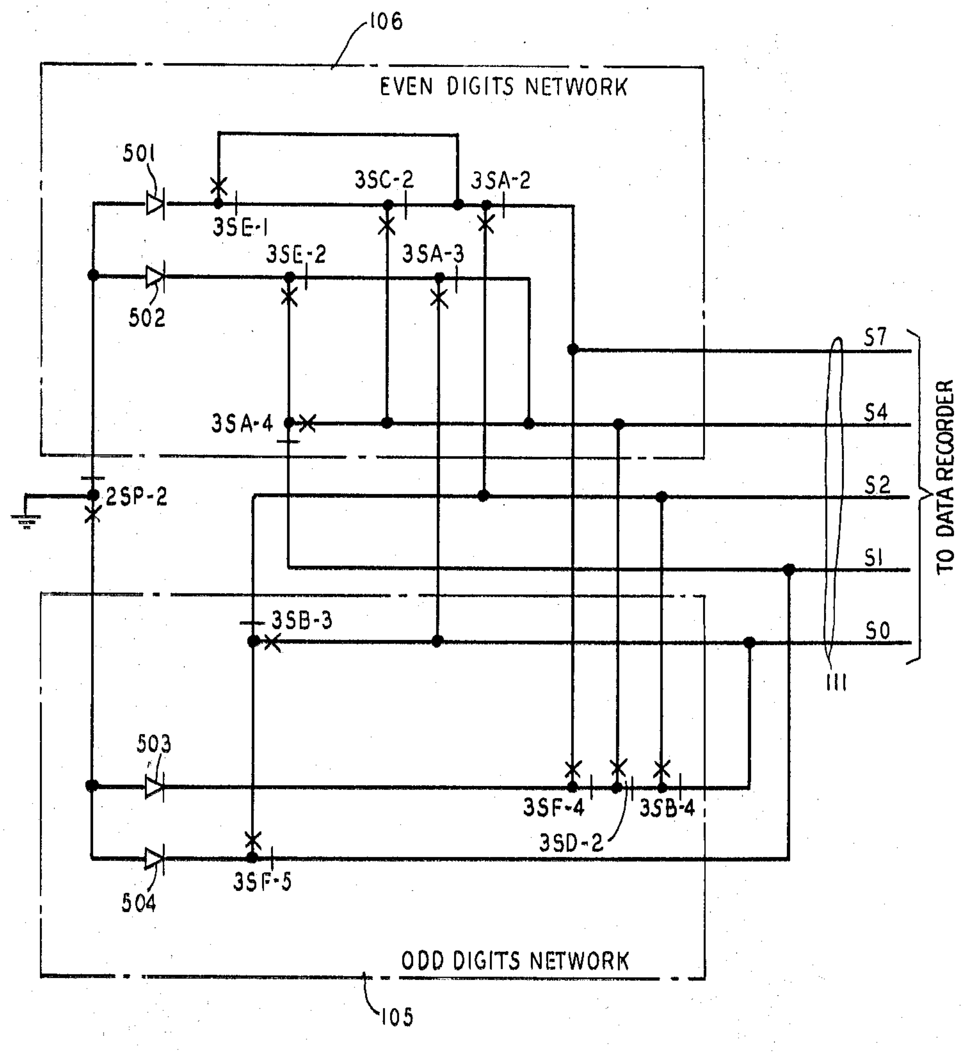

It will be noted that FIGS. 2, 3, and 5 employ the type of notation referred to as "detached contact" in which an X, shown intersecting a conductor, represents a normally open contact of a relay, and a bar, shown intersecting a conductor at right angles, represents a normally closed contact relay; "normally" referring to the unoperated condition of the relay. The principles of this type of notation are described in an article entitled, "An Improved Detached-Contact-Type Schematic Circuit Drawing" by F. T. Meyer in the September 1955 publication of the American Institute of Electrical Engineers Transactions, Communications and Electronics, volume 74, pages 505–513.

It will also be noted that in order to simplify the disclosure and thus facilitate a more complete understanding of the embodiment, the relays and relay contacts shown in FIGS. 2, 3, and 5 have been given systematic designations. The number preceding the letters of each relay corresponds to the figure in which the coil of the relay is shown. Thus the coil of relay 2SP is shown in FIG. 2. Each relay contact, either make, break or transfer, is shown with its specific contact number preceded by the designation of the relay to which it belongs. For example, the notation 2SP1–4 shown associated with an X indicates make contact number 4 of relay 2SP1, the coil of which is shown in FIG. 2.

GENERAL DESCRIPTION

Figure 1:
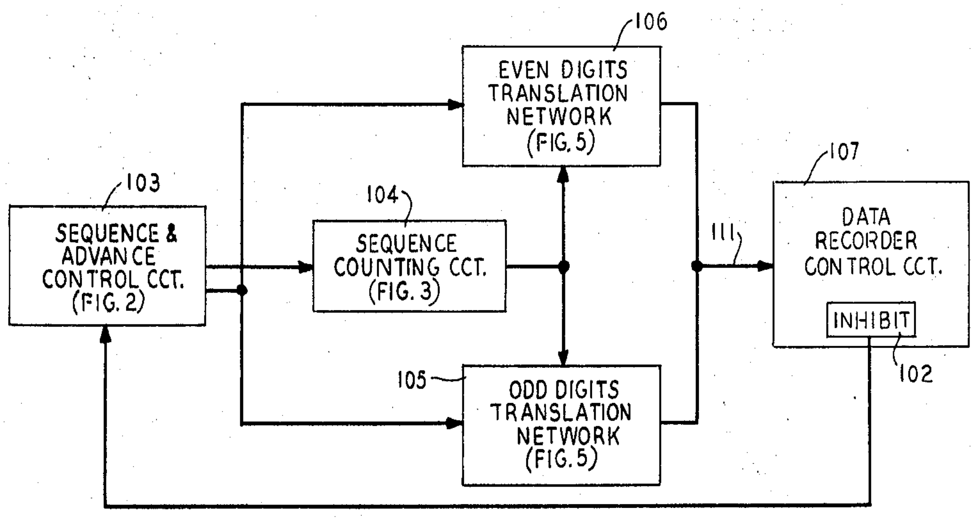
FIG. 1 is a block diagram representation of an exemplary embodiment of the invention.

As seen in FIG. 1 a pair of output translation networks 105 and 106 are sequentially enabled by sequence control circuit 103 to provide to a data recorder control circuit 107 a value corresponding to a counted number of signals, as counted by sequence counting circuit 104.

The data usage recorder control circuit 107 receives input data from the even and odd digits networks 106 and 105 over bus 111 which is multipled to each network. The recorder circuit may be any one of a number of configurations well known in the prior art, such as the recorder disclosed in the aforementioned Carpenter patent. It is to be noted that while FIG. 1 shows only one recorder circuit, it is to be understood that block 107 in fact may represent a plurality of such recorders or processing systems, each of which can be connected, either simultaneously or serially, to the data presentation circuit in the well known manner.

The inhibiting circuit 102 provides an indication to the sequence and advance control circuit whenever the data usage recorder 107 is in the process of recording the time data. As will be more apparent from that which is contained hereinafter, the inhibiting circuit serves to prevent the presentation of new time data while any recorder or processing system is in the process of receiving existing time data.

Signals are generated at one second intervals and applied in the sequence and advance control circuit 103 to advance the counting circuit 104, providing, of course, that an inhibiting indication is not present. For any even number of counted signals, as determined by signal counting circuit 104, the even digits translation network 106 is effective, under control of the sequence circuit 103, to provide a code associated with that number over data path 111. For any odd number, the odd digits translation network 105 provides the associated code. Thus for each one second timing pulse, one translation network, either 105 or 106, changes under control of advance control circuit 103 to reflect the code associated with the counted number of that pulse, while the opposite network of the pair remains fixed. Concurrent with the changing of the one network, the sequence control circuit connects data 111 to the fixed network.

As an example of this dual-network translation system, assume that the time (in seconds) is zero. Under this condition the even digits circuit 106 provides a signal on data path 111 to the recorder, representing a zero. The odd digits network 105, although ineffective to provide time data, is concurrently prepared to provide a signal on data path 111 representing a one. Upon occurrence of the next one second timing pulse, circuit 103 acts to switch the signal transmission from network 106 to network 105, and thus a "one" is provided to the recorder circuit. The even network 106, now ineffective to transmit signals to the recorder, is changed from the zero code to the code representing the next even counted signal, which in this case would be "two."

Upon occurrence of the next one second timing pulse, sequence controller 103 enables the even network 106, thus providing the recorder circuit with time data showing "two" seconds. The odd network 105 is now changed in preparation for the occurrence of the next timing pulse by changing the translated code contained within that network from a "one" to a "three." This alternation between the translation networks continues with each network being changed in an arithmetical progression by a common factor of two, and alternatively enabled so as to transmit an arithmetical progression, with a factor of one, over the common data path 111.

DETAILED DESCRIPTION

(1) The sequence and advance control circuit 103—FIG. 2

The basic one second timing pulses are provided by a cam 201 driven by a motor (not shown) in a manner well known in the art, at a speed of 1 revolution every 2 seconds. Therefore, cam contacts A and B each close momentarily once per two second interval, with each contact being operated one second after the other. After the passage of one second, cam 201 is in the operate position of cam contact A. Operation of contact A provides an obvious operate path for relay 2P1 from ground through normal break contact 2SP1–1, through the winding of the 2P1 relay to a source of negative potential (hereinafter referred to as battery). Relay 2P1 thereupon operated, locks operated through its own make contact 2P1–2 and normal break contact 2P2–3. It should be noted at this point that prior to the operation of relay 2P1, double wound Polar relay 2SP is held in a released condition with current flowing from battery through resistor 206, normal break contact 2SP1–2 through the secondary (s) winding relay 2SP thereby maintaining relay 2SP in a released condition. Relay 2SP is advantageously a fast operate and release relay, as of the mercury contact type, having operate and release times of the order of 1.5 milliseconds.

Digressing for a moment it should also be noted that SCR 204 is a silicon controlled rectifier of a type which, as is well known in the art, will remain as a high impedance even when forward biased. However, a positive potential (with respect to the cathode) applied to the gate will cause the SCR to act as a low impedance from cathode to anode. Once the SCR is conducting current it will continue to do so, irrespective of the gate voltage, until the anode potential is removed. In the instant arrangement, contact 202 in the data recorder symbolically represents equipment well known in the art which is placed in an operative condition during the activated state of the recorder circuit and conversely in the released condition during the non-operative state. Ground is therefore removed from the gate of SCR 204 whenever the data recorder is in the process of obtaining time data from either one of the channels. Removal of the ground potential (which is positive with respect to the cathode) prevents SCR 204 from conducting current even when forward biased and thus prevents, as will be more apparent in that contained hereinafter, the operation or release of relay 2SP.

Assume now that positive potential via ground through data recorder contact 202 is present on the gate of SCR 204. The operation of relay 2P1, as set forth above, connects a ground through the primary (P) winding of relay 2SP, through diode 205, through make contact 2P1–1 to the anode of SCR 204. Since SCR 204 has negative potential on the cathode through a resistor 203, it is now forward biased from cathode to anode and since a positive potential is also present at the gate, a low impedance path through the SCR exists. Thus, current now flows through the primary winding of relay 2SP. This forward current is greater in magnitude (resistor 206 has a higher resistance than does resistor 203) than that which is flowing through resistor 206 and in the reverse direction through the secondary winding of relay 2SP. Accordingly, relay 2SP operates at this time.

Obviously had the data recorder been in the process of receiving a time value from either the even or the odd network when relay 2P1 operated, data recorder contact 202 would have been operated. Under this condition SCR 204 would continue to present a high impedance path thus preventing the operation of relay 2SP. As will be more apparent from that which is contained hereinafter, removing ground from the gate of SCR 204 serves to inhibit all counting and sequenching functions of the information presentation circuit.

The operation of relay 2SP causes the operation of relay 2SP1 over contact 2SP–1. Operation of relay 2SP1, in turn, causes relay 2SP to lock operated from battery through resistor 206, operated make contact 2SP1–2, and the primary winding of relay 2SP to ground. Resistance battery through make contact 2SP1–2 also serves to remove the positive anode potential from SCR 204 (resistor 206 has a lower resistance than does either of the windings of relay 2SP) thus causing SCR 204 to again assume a high impedance state betwen cathode and anode. Operation of relay 2SP1 also prepares an operate path for relay 2P2 over contact 2SP1–1. However, relay 2P2 cannot operate until cam contact B operates.

Summarizing at this point, relay 2P1 is held operated through operated make contact 2P1–2 and released break contact 2P2–3. Relay 2SP is held operated from battery through resistor 206, enabled make contact 2SP1–2 and through the primary winding of relay 2SP. SCR 204 is not conducting and relay 2SP1 is operated.

One second after the motor driven cam 201 has operated contact A, it is in a position to operate contact B. Operation of contact B causes relay 2P2 to operate through previously operated make contact 2SP1–1. The operation of relay 2P2 causes the release of relay 2P1 by means of enabled break contact 2P2–3. Relay 2P2 thereupon locks operated through operated make contacts 2P2–2 and 2SP1–5 to ground. Relay 2P1 in releasing prepares a path whereby ground, through the S winding of relay 2SP, diode 207, operated make contact 2P2–1 and normal break contact 2P1–1, is placed on the anode of SCR 204, thus causing the SCR to again conduct (assuming data recorder contact 202 is normal). Current then flows through the SCR from resistance battery through the above set forth path and through the S winding of relay 2SP. However, since the current through the secondary winding is in the reverse direction and is of a magnitude greater than the current flowing in the forward direction through winding P, relay 2SP releases. The release of relay 2SP causes the release of relay 2SP1. The release of relay 2SP1 places a battery on winding S of relay 2SP, through normal break contact 2SP1–2 and also removes the positive potential from the anode of SCR 204, causing it to again become a source of high impedance. Release of relay 2SP1 also causes the release of relay 2P2 over make contact 2SP1–5 and prepares an operate path for relay 2P1 through normal break contact 2SP1–1.

It should be noted that had the data recorder been in the process of recording time data when cam contact B operated (operating relay 2P2) the ground would not have been present on the gate of SCR 204. Thus, the SCR would continue to present a high impedance preventing relay 2SP from releasing.

After the receipt of the two one second timing pulses, in sequence, one each from cam contacts A and B, all relays shown in FIG. 2 are again normal. Thus the circuit is prepared to begin the same sequence of operation upon the re-occurrence of each one second timing pulse.

In summary, it can be seen that relay 2SP operates upon the operation of cam contact A and releases upon the operation of cam contact B. This alternate operation of relay 2SP is shown on the chart in FIG. 4, where the shaded blocks represent the operated state of a relay (or cam contact), while the unshaded blocks represent the released condition of the various relays (or cam contacts). It can be seen from FIG. 4 that corresponding to every odd counted pulse, cam A and relay 2SP are both operated, whereas cam B is operated and relay 2SP is normal during the even counted pulses.

(2) Sequence counting circuit 104—(FIG. 3)

The enabling of contact 2SP1–4 (note that contact 2SP1–4 operates and releases with the operation and release of relay 2SP) causes the operation of relay 3SA by closing a path from negative battery through resistance lamp 301, released break contacts 3SF–3 and 3SB–2, through the winding of the 3SA relay to ground. Enabling of relay 3SA extends the negative battery (the resistance of lamp 301 being less than that of any of the relay windings shown in FIG. 3) over operated make contact 3SA–1 to the winding of relay 3SB. Negative battery on both sides of relay 3SB, however, maintains the relay in its normal condition.

Contact 2SP1–4 upon restoring to normal removes the negative potential from one side of the 3SB relay winding thereby allowing relay 3SB to operate through contact 3SA–1 to ground through the winding of relay 3SA. Relays 3SA and 3SB both lock operated in series.

Figure 4:
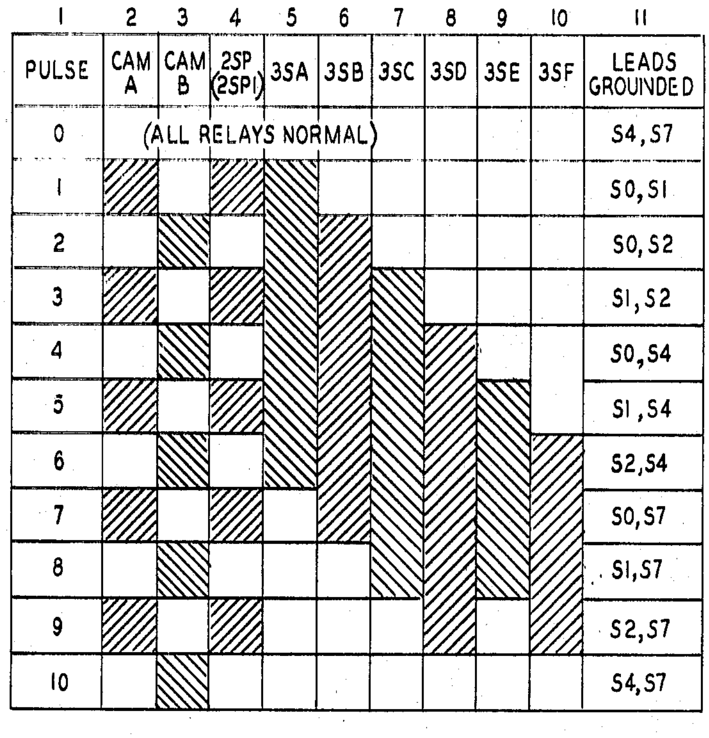
FIG. 4 is a chart showing the relative operate and release times of the various relays in relation to a counted number of pulses.

As summarized in FIG. 4, relays 3SC and 3SE operate with successive operations of relay 2SP1 while relays 3SD and 3SF operate with successive releases of relay 2SP1. Relays 3SA through 3SF therefore operate sequentially, from 3SA to 3SF, upon receipt of each one second timing pulse (1–6).

The enabling of contacts 3SF–3 and 3SF–2, upon the operation of relay 3SF (pulse 6), transfers control of the translation chain from make contact 2SP1–4 to make contact 2SP1–3. The enabling of contact 2SP1–3, upon the operation of relay 2SP1 for the fourth time (timing pulse 7), connects a ground through enabled make contacts 3SF–2, 3SB–1, and 3SA–1 to the winding of relay 3SA thereby shunting down relay 3SA while providing a holding path for relay 3SB. The receipt of timing pulse 8, upon the operation of cam contact B for the fourth time, causes the release of relay 2SP1. Contact 2SP1–3 in releasing removes the holding ground from the winding of relay 3SB thereby releasing the relay. Upon the reenabling of contact 2SP1–3, a ground is provided through normal contact 3SB–1 to the winding of relay 3SD as a holding path for that relay. Ground is also thereby extended through operated make contact 3SC–1 to shunt down relay 3SC which was being held operated through the winding of relay 3SD. The release of contact 3SC–1 extends a holding ground to the winding of relay 3SF and also provides ground through operated make contact 3SF–1 to shunt down relay 3SE.

Therefore, as shown in FIG. 4, after receipt of nine one second timing pulses, only translation relays 3SD and 3SF remain operated. Release of make contact 2SP1–3, upon receipt of timing pulse 10 (operation of cam contact B), causes the release of relays 3SD and 3SF by removing the holding ground from each winding. The translation relays, 3SA through 3SF, are now once again in a position to repeat the sequence, as set out above, for the one second timing pulses 1 through 9, thus providing a unique combination of operated relays for each counted number of pulses.

(3) Translation networks 105 and 106—FIG. 5

As already set forth, the alternate operation of cam contacts A and B causes the operation and release, respectively, of relay 2SP. It will also be recalled that relay 2SP is operated during each odd counted pulse and released during even pulses. A review of FIG. 4, wi.h respect to columns 1 through 4, clearly illustrates the relationship between the pulses, the cam contact operation and the enabling of the 2SP relay.

FIG. 4 further serves visually to indicate the relationship bteween the translation relays 3SA through 3SF and receipt of the pulses. It can be seen from columns 5 through 10, that relays 3SA 3SC and 3SE each change state (operate or release) only upon occurrence of an odd numbered pulse. For example, relay 3SA operates upon occurrence of timing pulse number 1 and releases on timing pulse number 7. Likewise, relay 3SC operates at pulse 3 and releases at pulse 9. In similar manner, relays 3SB, 3SD and 3SF each change state only upon receipt of an even numbered pulse. The importance of this alternate operation of the 3SA through 3SF translation relays will become apparent from that which is contained hereinafter.

Turning now to FIG. 5, assume the time to be zero seconds. At this time, all translation relays are normal. Under these conditions, a ground is extended through normal break contact 2SP–2, forward biased diodes 501 and 502, and through released break contacts 3SE–1, 3SC–2 and 3SA–2 to lead S7, and through released break contacts 3SE–2 and 3SA–3 to lead S4. Thus, relay 2SP released, in combination with all translation relays normal, provides grounds over the S4 and S7 leads to the data recorder. A discrete value, which in this case corresponds to zero counted pulses, is therefore transmitted to the data recorder. As is apparent the timing information is supplied to the data recorder control circuit 107 in the well known two-out-of-five code.

Although no one second timing pulses have occurred, a path is also prepared from normal make contact 2SP–2 through diodes 503 and 504, through released break contact 3SF-5 to lead S1 and through released break contacts 3SF–4, 3SD–2 and 3SB–4 to lead S0. However, since make contact 2SP–2 in normal, the ground is not available for presentation over leads S0 and S1 to the data recorder.

As previously described, receipt of timing pulse 1 (operation of cam contact A) causes the operation of fast acting relay 2SP. Immediately thereupon, the operation of transfer contact 2SP–2 causes ground to be removed from leads S7 and S4 and causes the ground to be transmitted to the data recorder over leads S1 and S0, thereby effectively inhibiting the even digit network while enabling the odd digit network. Thus, a discrete value of time information corresponding to the counted number "one" is presented to the data recorder.

It should be noted that the translation of the counted pulses into discrete values takes place within either the even or the odd network, the odd network 105 presenting the counted odd numbers while the even network 106 presents the even counted numbers. This follows from the operation of transfer contact 2SP–2 which provides ground to the odd network only while in an operated condition while supplying ground to the even network when released. Note that from the previous discussion contact 2SP1 is enabled only during odd pulses. As has been described, the translation relays associated with the even digits network (3SA, 3SC and 3SE) only change state upon receipt of an odd pulse. The translation relays of the odd digits network (3SB, 3SD and 3SF) only change state upon receipt of an even pulse. Thus, while one network is presenting time information associated with a given pulse, the other network is being changed in preparation for the presentation of the next time value.

Returning now to FIG. 5, simultaneous with the operation of relay 2SP (establishment of the output presentation of the value "one" under control of the odd network) relay 3SA operates. A path is then prepared from operated break contact 2SP–2 through diodes 501 and 502, through released break contacts 3SE–1 and 3SC–2 and operated make contact 3SA–2 to lead S2. A path is also extended to lead S0 through released break contact 3SE–2 and operated make contact 3SA–3. However, break contact 2SP–2 being operated prevents ground from appearing on these leads.

Receipt of timing pulse 2 (transfer contact 2SP releasing) causes ground to be extended over the above set forth paths to leads S0 and S2, simultaneous with the removal of ground from leads S0 and S1. Release of relay 2SP causes the operation of relay 3SB (as previously described) thus preparing for the presentation of the digit (3) over leads S1 and S2 by means of an obvious path through the odd digits network. This alternation between networks continues for nine pulses, each pulse providing a discrete time value indication to the data recorder as summarized in column 11 of FIG. 4.

In summary, it can be seen that pulses generated at predetermined intervals are counted and translated into discrete output values corresponding to the counted number of the pulses. The common bus 111 is utilized to transmit each time value to a data recorder sequentially from a pair of output translation networks. One network is operative in response to receipt of each pulse for providing the output value associated with that pulse while the value contained in the other network is concurrently being increased to reflect the value associated with a subsequent pulse.

It is to be understood that the above-described arrangements are illustrative of the application of the principles of the invention. Numerous other arrangements may be devised by those skilled in the art without departing from the spirit and scope of the invention.

What is claimed is:

1. In combination:
a source of signals,
means for counting said signals,
a pair of output channels sequentially operable to provide output values in a predetermined sequence corresponding to a counted number of said signals,
means for alternatively enabling each said channel,
and means concurrently operative with the enabling of one said channel for changing the output value of said other channel.

2. The combination set forth in claim 1 wherein said changing means is controlled by said alternatively enabling means.

3. The combination set forth in claim 1 further comprising a common bus and wherein said output channels are multiplied to said common bus.

4. In combination:
a source of timing signals,
a pair of output translation networks each operable to provide an output value corresponding to a counted number of said timing signals,
means responsive to each of said signals for alternatively enabling each said network in sequence, and
means concurrently operative with the enabling of each said network for increasing the output value of the other said network.

5. The combination in accordance with claim 4 wherein said increasing means is controlled by said alternatively enabling means.

6. The combination in accordance with claim 5 further comprising a common bus and wherein said output networks are multipled to said common bus.

7. The combination in accordance with claim 6 further comprising receiving means associated with said common bus for receiving said output values,
and means operative in response to the enabling of said receiving means for inhibiting said alternatively enabling means.

8. A circuit comprising a source of signals,
means for counting said signals,
a pair of output networks each operable to translate a counted number of said signals into a value exclusively associated with said counted number, means for establishing in one of said output networks the value corresponding to the counted number of said signals, and
means for simultaneously initiating in the other of said output networks the establishment of the value corresponding to a counted number of said signals one greater than the said counted number of said signals established in said one channel.

9. A circuit as set forth in claim 8 further comprising means for alternatively enabling in sequence each of said output networks.

10. In a switching circuit:
the combination set forth in claim 9 wherein said alternatively enabling means is operative in response to receipt of each of said signals from said signal source.

11. An information presentation circuit comprising in combination:
a source of signals,
a plurality of relays operable for counting said signals,
a first group of contacts of said counting relays arranged as a first channel operable to provide output values corresponding to each odd counted number of said signals,
a second group of contacts of said counting relays arranged as a second channel operable to provide output values corresponding to each even counted number of said signals, and
means responsive to receipt of counted signal and dependent on its being an odd or even counted signal for enabling one of said channels and inhibiting the other of said channels.

12. The combination set forth in claim 11 further comprising means concurrently operative with the enabling of said one channel for increasing the output value of said other channel.

13. A relay circuit for presenting time values at successive time intervals to a utilization circuit comprising:
means for counting successive pulses representing said time intervals,
an odd and an even translation network responsive to said counting means, and
means responsive to said counting means for alternatively enabling each one of said networks in sequence to present coded time value indications to the utilization circuit while incrementing by two the time value indication of the other of said networks.

References Cited

UNITED STATES PATENTS 3,125,642 3/1964 Anderson et al. ______ 179—18

DONALD J. YUSKO, Primary Examiner

M. SLOBASKY, Assistant Examiner

U.S. Cl. X.R.

179—18; 340—168